US012661911B2

(12) United States Patent
Miyamoto et al.

(10) Patent No.: US 12,661,911 B2
(45) Date of Patent: Jun. 23, 2026

(54) PLATEN, PRINTING DEVICE

(71) Applicant: SEIKO EPSON CORPORATION, Tokyo (JP)

(72) Inventors: Satoru Miyamoto, Matsumoto (JP); Yusuke Kato, Shiojiri (JP); Yutaka Nagashima, Matsumoto (JP); Nobuaki Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 18/626,909

(22) Filed: Apr. 4, 2024

(65) Prior Publication Data

US 2024/0336075 A1 Oct. 10, 2024

(30) Foreign Application Priority Data

Apr. 6, 2023 (JP) ................................. 2023-061922

(51) Int. Cl.
*B41J 3/407* (2006.01)
*B41J 11/06* (2006.01)
*B41J 11/14* (2006.01)

(52) U.S. Cl.
CPC ............. *B41J 11/14* (2013.01); *B41J 3/4078* (2013.01); *B41J 11/06* (2013.01)

(58) Field of Classification Search
CPC ................................ B41J 3/4078; B41J 11/06
See application file for complete search history.

(56) References Cited

U.S. PATENT DOCUMENTS 3,094,064 A * 6/1963 Pecchenino ................ B41J 1/14 101/93.46
2004/0179081 A1* 9/2004 Nimi ........................ B41J 11/06 347/104
2011/0242189 A1* 10/2011 Okada .................... B41J 3/4078 524/401

FOREIGN PATENT DOCUMENTS

JP 2004-276319 A 10/2004

* cited by examiner

*Primary Examiner* — Scott A Richmond
(74) *Attorney, Agent, or Firm* — WORKMAN NYDEGGER

(57) ABSTRACT

A platen includes a support section configured to support a printing area of a medium; a base section fixed to the support section; a moving section configured to move relative to the base section; and a guide section configured to guide the movement of the moving section, wherein the guide section is incorporated so as to not protrude from the outer shape of the base section and the moving section.

10 Claims, 15 Drawing Sheets

PLATEN, PRINTING DEVICE

The present application is based on, and claims priority from JP Application Serial Number 2023-061922, filed Apr. 6, 2023, the disclosure of which is hereby incorporated by reference herein in its entirety.

BACKGROUND

1. Technical Field

The present disclosure relates to a platen and a printing device.

2. Related Art

In the related art, as shown in JP-A-2004-276319, there is known an inkjet type clothes printing device including an inkjet head, a platen on which clothes can be set, and a guide plate for positioning a set position of the clothes with respect to the platen. The guide plate is configured such that its relative position with respect to the platen can be changed by a screw shaft, a butterfly nut, or the like.

However, in the above described device, since the screw shaft and the butterfly nut are disposed in a state of protruding downward from a lower surface of the guide plate, there is a problem that, when the clothes are set on the platen, the clothes are caught on the screw shaft or the like, the clothes cannot be smoothly set, and the clothes are damaged.

SUMMARY

A platen includes a support section configured to support a printing area of a medium; a base section fixed to the support section; a moving section configured to move relative to the base section; and a guide section configured to guide the movement of the moving section, wherein the guide section is incorporated so as to not protrude from the outer shape of the base section and the moving section.

A printing device includes a printing section configured to print on a medium; a support section configured to support a printing area of the medium; a placement section on which the support section is placed; a base section fixed to the support section; a moving section configured to move relative to the base section; and a guide section configured to guide the movement of the moving section, wherein the guide section is incorporated so as to not protrude from the outer shape of the base section and the moving section.

DESCRIPTION OF EMBODIMENTS

1. First Embodiment

First, a configuration example of a printing device 1 provided with a platen 30 for supporting a medium M will be described. The printing device 1 of the present embodiment is an inkjet printer that prints characters, images, and the like on the medium M (for example, a fabric such as a T-shirt Ma) supported by the platen 30.

In the following drawings, XYZ axes are given as coordinate axes orthogonal to each other as necessary. A direction along an X-axis is the lateral width direction of the printing device 1. A direction along a Y-axis is a depth direction of the printing device 1. A direction along a Z-axis is a height direction of the printing device 1.

Figure 1:
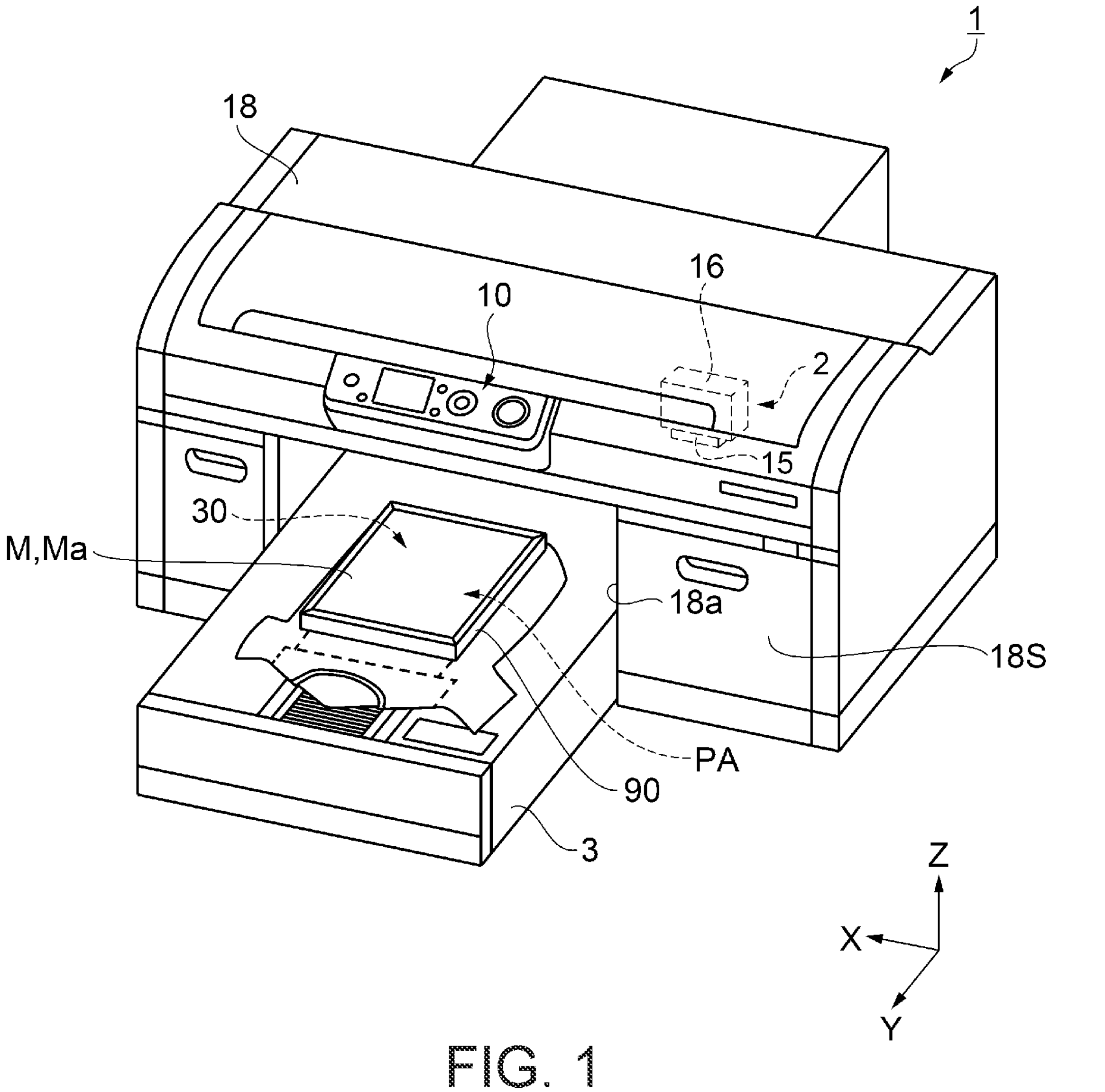
FIG. 1 is a perspective view showing the structure of a printing device.
Figure 2:
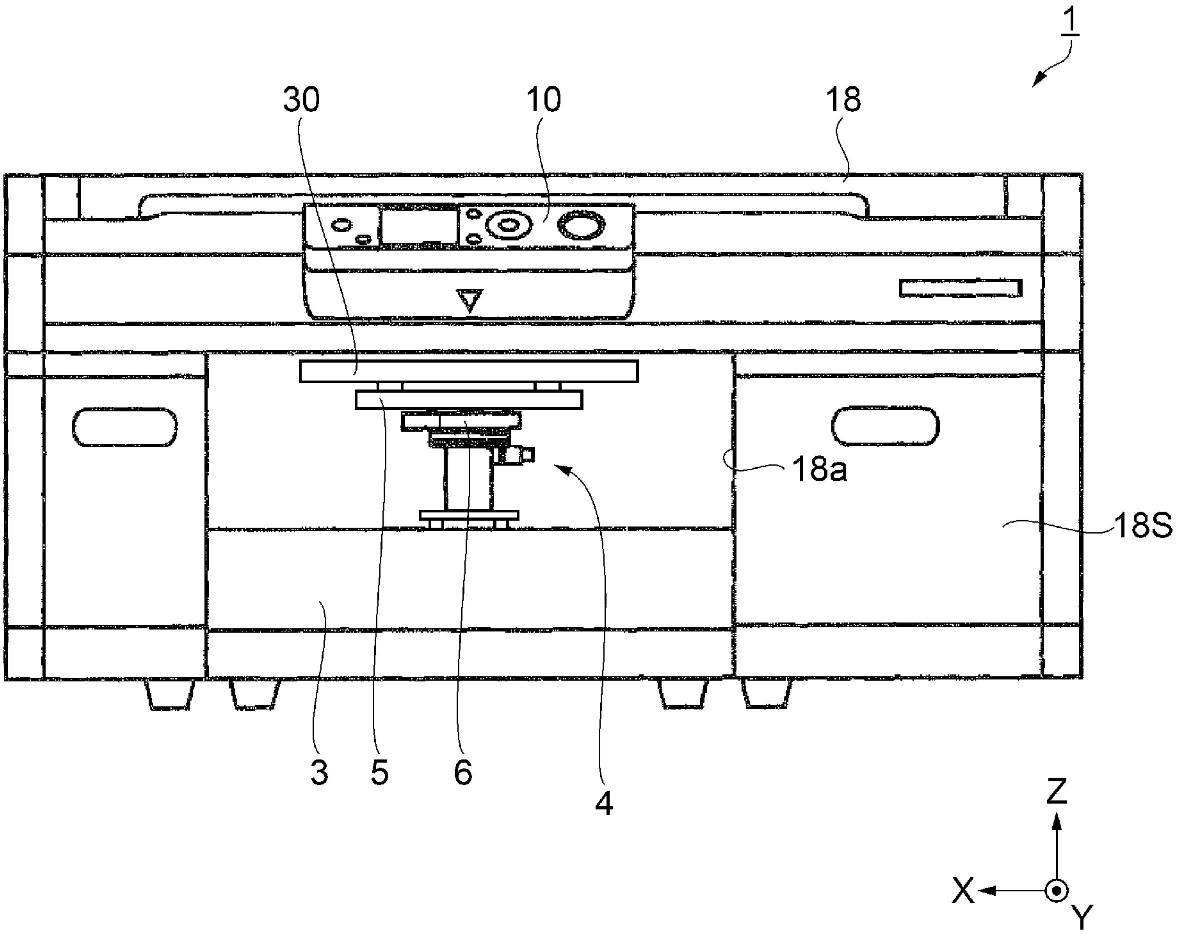
FIG. 2 is a front view showing a configuration of the printing device.

As shown in FIGS. 1 and 2, the printing device 1 includes a printing section 2, a transport section 3, a placement section 4, a platen 30, and an exterior 18. The printing device 1 further includes a control section (processor) that comprehensively controls the operation of the various components. FIG. 1 shows a state in which the T-shirt Ma, which is an example of the medium M, is set on the platen 30. The T-shirt Ma can be set in any direction, but in the example of FIG. 1, the chest side of the T-shirt Ma faces upward.

The exterior 18 is a substantially rectangular parallelepiped housing. The exterior 18 houses the printing section 2 and various components. The exterior 18 includes a sidewall 18S formed at the end portion of the exterior 18 in the +Y direction and a plurality of other sidewalls (not shown).

An operation panel 10 is disposed in front of and above the exterior 18. The operation panel 10 has a display function to display various information on the operation of the printing device 1 and an input function to receive various instructions corresponding to operating conditions and the like. The operation panel 10 includes, for example, a touch panel type liquid crystal display device. The operation panel 10 is electrically connected to the control section. The operation panel 10 may be provided with various buttons in addition to the liquid crystal display device. Note that various instructions for the operation of the printing device 1 may be input to the printing device 1 via an information terminal such as a personal computer, for example.

The printing section 2 prints on the medium M. The printing section 2 includes a head 15, a carriage 16, and the like. The head 15 is disposed at a lower portion of the carriage 16. The head 15 prints by applying ink as a liquid onto a surface of the medium M. A nozzle surface is formed on a-Z direction end surface of the head 15. The nozzle surface faces the platen 30 in an up-down direction during printing by the printing device 1. A plurality of nozzle rows are arranged on the nozzle face.

Each of the plurality of nozzle raws is made up of a plurality of nozzles, and each of the nozzle raws individually ejects ink exhibiting a color such as cyan, magenta, yellow, black, white, or the like. These inks are supplied to the head 15 through pipes from ink containers (not shown) housed in the exterior 18. The ink ejected from the head 15 may be a liquid such as clear ink or treatment liquid in addition to the ink of each color described above.

Piezoelectric elements are applied to the head 15 as actuators that are driving units for ejecting ink. As the driving unit other than the piezoelectric element, for example, an electromechanical transducer element that displaces a vibration plate as an actuator by electrostatic attraction, or an electrothermal transducer element that ejects ink using air bubbles generated by heating may be used.

The carriage 16 is connected to a timing belt (not shown), and the timing belt is driven by a carriage motor. The timing belt causes the carriage 16 to reciprocate movement in a direction along the X-axis, which is a main scanning direction, by driving a carriage motor.

In the exterior 18, an opening section 18*a* is provided in a part of the sidewall 18S. The transport section 3 is disposed in the opening section 18*a*. The transport section 3 is disposed in a state of protruding from the sidewall 18S in the +Y direction. The placement section 4 is disposed on the upper portion of the transport section 3. The platen 30 is disposed on the upper portion of the placement section 4.

The placement section 4 includes a support base 5 and an up-down movement mechanism 6. The support base 5 is positioned at the uppermost portion of the placement section 4 and supports the platen 30. The platen 30 is detachable from and attachable to the support base 5.

The up-down movement mechanism 6 is configured by, for example, a ball screw and the support base 5 can be moved in the direction along the Z-axis by operating a lever or the like. Accordingly, it is possible to adjust the distance dimension between the surface of the medium M supported by the platen 30 on which printing is performed and the nozzle surface of the head 15.

The transport section 3 moves the placement section 4 in the direction along the Y-axis by the driving of a transport motor. Thus, the platen 30 supported by the placement section 4 can be moved in the direction along the Y-axis, to move the platen 30 to a position facing the head 15.

When printing is executed in the printing device 1, the platen 30 relatively moves in the +Y direction or the −Y direction with respect to the head 15, and the head 15 reciprocate movements in the direction along the X-axis with respect to the platen 30. Thus, a desired image or the like is printed on the surface facing upward of the T-shirt Ma set on the platen 30.

The platen 30 and the placement section 4 are retreatable a position protruding toward the −Y direction side of the exterior 18 during printing. Therefore, it is possible to perform printing on a wide region along the Y-axis in the T-shirt Ma set on the platen 30. Note that at the position where the platen 30 and the placement section 4 protrude toward the −Y direction side of the exterior 18, the platen 30 and the placement section 4 are covered with an auxiliary exterior.

Next, the configuration of the platen 30 will be described.

Figure 3A:
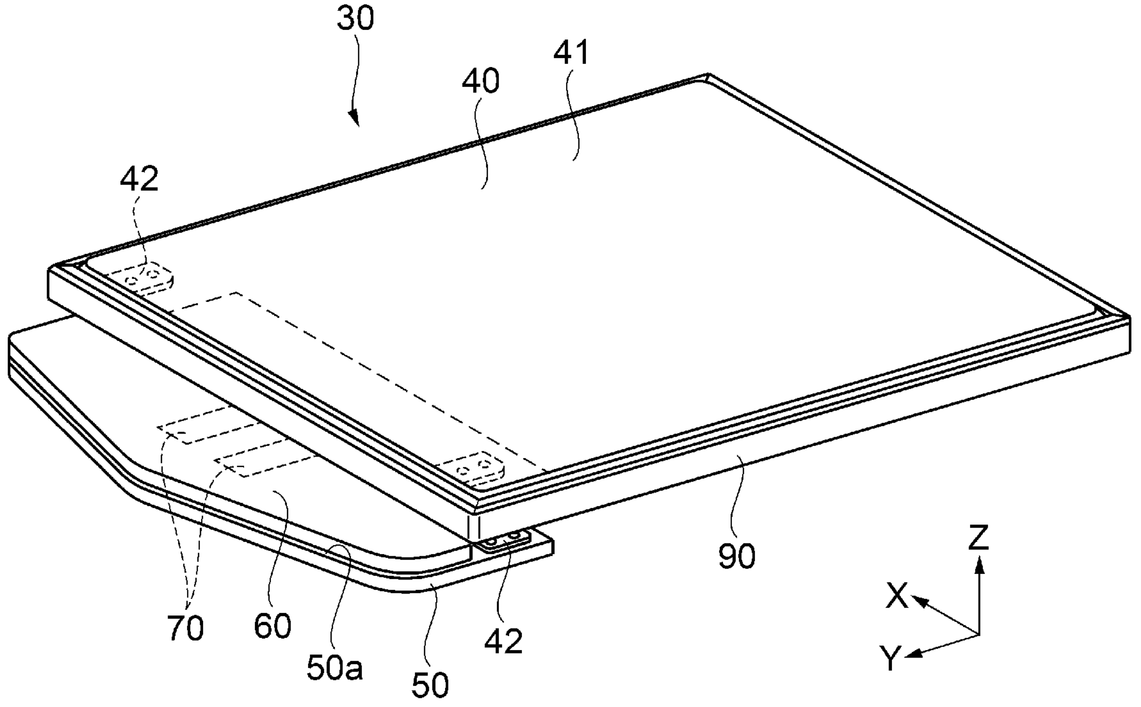
FIG. 3A is a perspective view showing a configuration of a platen.
Figure 3B:
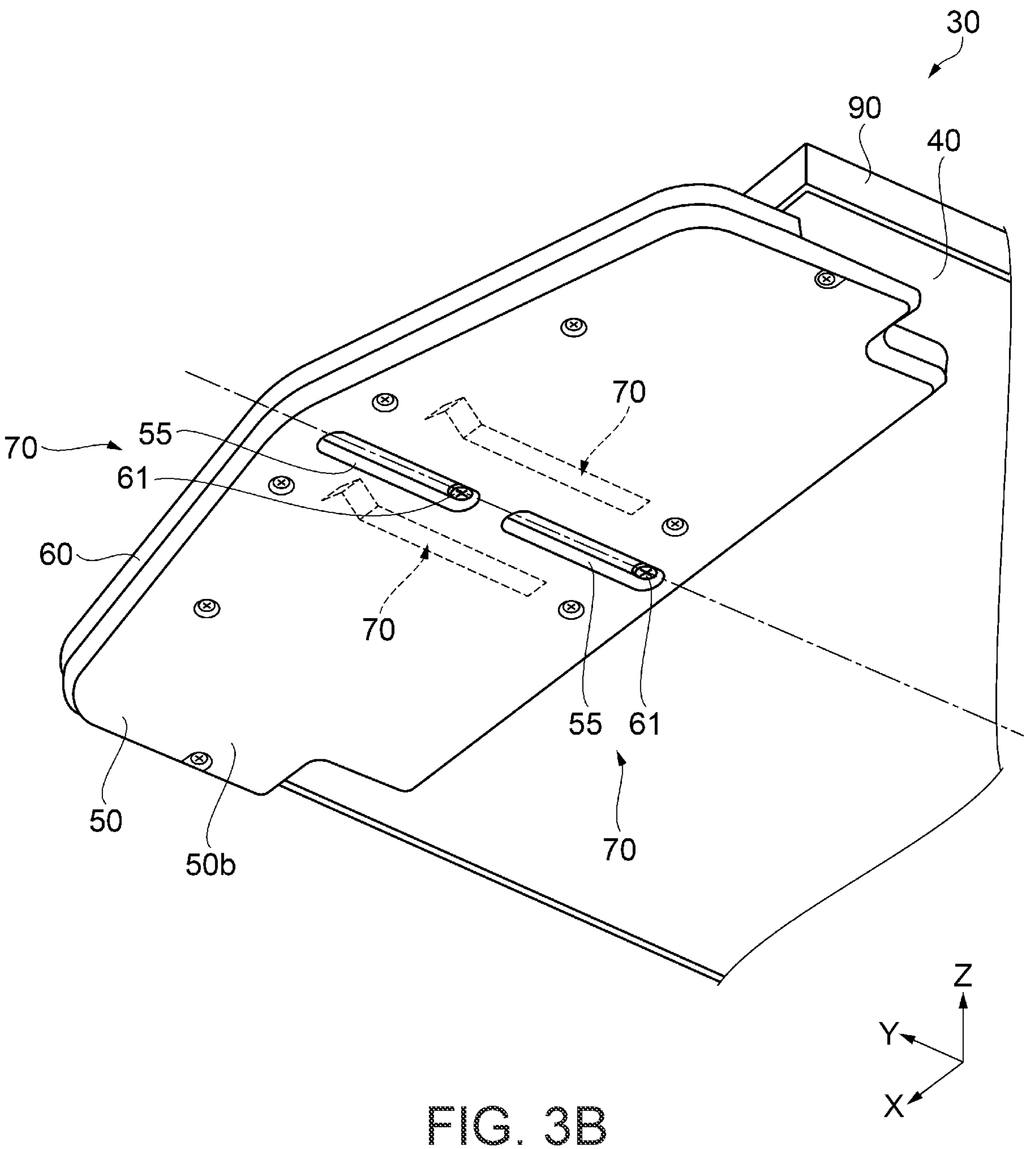
FIG. 3B is a perspective view showing a configuration of the platen.
Figure 3C:
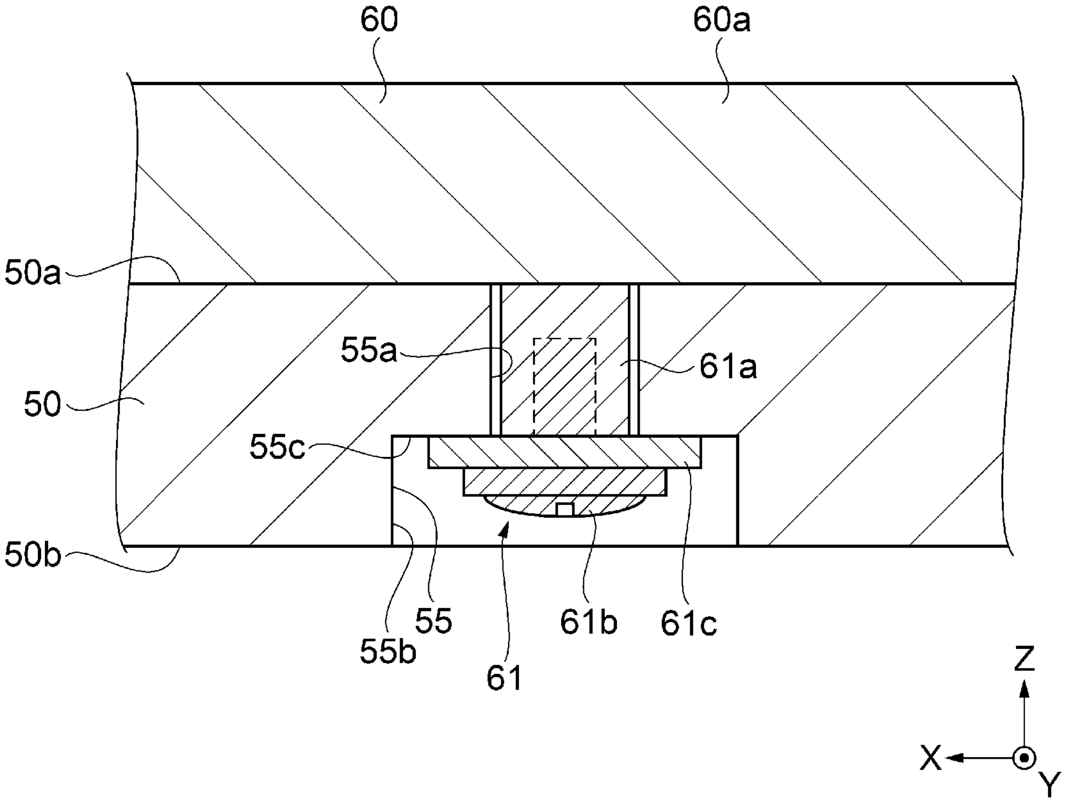
FIG. 3C is a partial cross-sectional view showing a configuration of the platen.

As shown in FIGS. 3A, 3B, and 3C, the platen 30 includes a support section 40 for supporting the medium M, a base section 50 fixed to the support section 40, a moving section 60 movable relative to the base section 50, and a guide section 70 for guiding the movement of the moving section 60. Furthermore, a frame 90 is provided. The guide section 70 of the present embodiment includes an engagement mechanism and a guide mechanism (to be described later). The platen 30 smoothly guides the movement of the moving section 60 by cooperation of the engagement mechanism and the guide mechanism, of the guide section 70.

The support section 40 is a plate-like member. An end portion of the support section 40 is chamfered. The support section 40 has a rectangular shape in a plan view. The support section 40 is supported by a support base 5 of the placement section 4. A support surface 41 that supports the medium M is disposed at an end portion of the support section 40 in the +Z direction. The support surface 41 is a flat surface formed in the XY plane.

In addition, the platen 30 of the present embodiment is configured to be able to support a portion of the medium M on the moving section 60 in addition to the support section 40, but the support section 40 supports a printing area PA which is a portion in which printing is executed on the medium M (FIG. 1).

The frame 90 is a frame body that can be fitted into end portions on four sides of the support section 40. The frame 90 is formed of a plate material such as a steel member, for example. The frame 90 has a rectangular shape in a plan view, and an opening is formed at a central portion thereof.

After the T-shirt Ma is set on the support section 40, the frame 90 is fitted from above along the four side end portions of the support section 40 via the T-shirt Ma (FIG. 1). Thus, the region surrounded by Frame 90 is defined as the printing area PA. Further, by using the frame 90, wrinkles of the T-shirt Ma in the printing area PA can be easily removed. Furthermore, displacement of the T-shirt Ma with respect to the support surface 41 during the printing operation is suppressed, and printing can be reliably performed on the printing area PA. The platen 30 may have a configuration in which the frame 90 is omitted.

The base section 50 is disposed below the support section 40. The base section 50 is a plate-like member. An end portion of the base section 50 is chamfered. The base section 50 is disposed substantially parallel to the support surface 41 of the support section 40. The maximum distance dimension in the direction along the X-axis of the base section 50 is substantially the same as the distance dimension in the direction along the X-axis of the support section 40. A part of the base section 50 in the −Y direction is disposed so as to overlap the support section 40 as the platen 30 is viewed in the −Z direction. In addition, a part of the base section 50 in the +Y direction is disposed so as to protrude in the +Y direction from the end portion of the support section 40 in the +Y direction.

The support section 40 and the base section 50 are fixed by a fixing plate 42 (for example, a sheet metal). The fixing plate 42 is disposed in a region where the support section 40 and the base section 50 overlap each other as the platen 30 is viewed in the −Z direction. Therefore, as the platen 30 is viewed in the −Z direction, the fixing plate 42 is disposed so as to not protrude from the outer shapes of the support section 40 and the base section 50. Thus, when the T-shirt Ma is set on the platen 30, the T-shirt Ma can be smoothly set without being caught.

In the present embodiment, the fixing plates 42 are disposed at the +X direction end portion and the −X direction end portion of each of the support section 40 and the base section 50. One end of the fixing plate 42 is fastened to the −Z direction end surface of the support section 40 by a fastening member (for example, a screw), and the other end of the fixing plate 42 is fastened to the +Z direction end surface of the base section 50. Thus, the base section 50 is fixed to the support section 40.

The moving section 60 is disposed between the support section 40 and the base section 50 in the direction along the Z-axis. The moving section 60 includes a main body section 60*a* that is a plate-like member. An end portion of the main body section 60*a* is chamfered. The moving section 60 is supported by the base section 50. The +Z direction end surface and the −Z direction end surface of the main body section 60*a* are substantially parallel to the support surface 41 of the support section 40 and the +Z direction end surface (slide surface 50*a*) of the base section 50.

A part of the moving section 60 in the −Y direction is disposed so as to overlap the support section 40 as the platen 30 is viewed in the −Z direction. In addition, a part of the moving section 60 in the +Y direction is disposed so as to protrude in the +Y direction from the end portion of the support section 40 in the +Y direction. The maximum distance dimension in the direction along the X-axis of the moving section 60 is substantially the same as the maximum distance dimension in the direction along the X-axis of the base section 50.

The moving section 60 is formed in a substantially V-shape (for example, a hanger shape) in which a central portion in a direction along the X-axis of the moving section 60 protrudes in the +Y direction. When setting the T-shirt Ma on the platen 30, cover the moving section 60 with the T-shirt Ma from the hem portion toward the −Y direction from the +Y direction end portion side and the neck and shoulders of the T-shirt Ma are aligned so that they correspond to the V-shaped portion at the end of the moving section 60 in the +Y direction. Thus, twists and wrinkles in the neck and shoulders of the T-shirt Ma are easily removed. A portion of the T-shirt Ma to be the printing area PA (for example, the chest or the back) is also supported on the support surface 41. Thereafter, the frame 90 is fitted along the four side end portions of the support section 40 via the T-shirt Ma.

The moving section 60 is configured to be movable in a state of being fitted with the base section 50. Specifically, as shown in FIGS. 3B and 3C, an elongated hole 55 that extends in the direction along the Y-axis is formed in the base section 50. The elongated hole 55 is a through hole penetrating the base section 50 in a direction along the Z-axis. The elongated hole 55 is configured by a first elongated hole 55*a* and a second elongated hole 55*b*. The first elongated hole 55*a* is provided on the +Z direction side in the direction along the Z-axis of the base section 50. The second elongated hole 55*b* is provided on the −Z direction side of the first elongated hole 55*a*. The distance dimension of the first elongated hole 55*a* in the direction along the X-axis is shorter than the distance dimension of the second elongated hole 55*b* in the direction along the X-axis. At a boundary portion between the first elongated hole 55*a* and the second elongated hole 55*b*, a step surface 55*c* is formed along a substantially horizontal direction.

The distance dimension of the elongated hole 55 in the direction along the Y-axis is set corresponding to the movable distance of the moving section 60 (to be described later).

A protrusion 61 protruding in the −Z direction from the −Z direction end surface of the main body section 60*a* is disposed on the moving section 60. The protrusion 61 includes a boss 61*a*, a screw 61*b*, and a washer 61*c*. The boss 61*a* is a columnar member protruding in the −Z direction from the −Z direction end surface of the main body section 60*a*. The distance dimension of the boss 61*a* in the direction along the X-axis is slightly shorter than the distance dimension of the first elongated hole 55*a* in the direction along the X-axis. The distance dimension of the boss 61*a* in the direction along the Z-axis is substantially the same as the distance dimension of the first elongated hole 55*a* in the direction along the Z-axis. On the −Z direction end surface of the boss 61*a*, a screw hole that engages with the screw 61*b* is formed toward the +Z direction. Then, the screw 61*b* is fastened to the boss 61*a* in a state where the washer 61*c* is fitted to the head of the screw 61*b*. In a state where the screw 61*b* is fastened to the boss 61*a*, the distance dimension of the washer 61*c* in the direction along the X-axis is longer than the distance dimension of the first elongated hole 55*a* in the direction along the X-axis, and is shorter than the distance dimension of the second elongated hole 55*b* in the direction along the X-axis. The +Z direction end face of the washer 61*c* and the step surface 55*c* are in contact with each other. Thus, the moving section 60 and the base section 50 are fitted with each other without the base section 50 disengaging from the protrusion 61. In the present embodiment, the main body section 60*a* and the base section 50 of the moving section 60 are fitted to each other so as to be pressed against each other with a constant load. Then, with the movement of the moving section 60, the protrusion 61 becomes movable along the elongated hole 55 (first elongated hole 55*a*). That is, the moving section 60 can move in the direction along the Y-axis along the elongated hole 55 with respect to the base section 50.

In addition, in a state where the washer 61*c* and the screw 61*b* are attached to the boss 61*a*, the distance dimension of the protrusion 61 protruding from the step surface 55*c* in the −Z direction is shorter than the distance dimension of the second elongated hole 55*b* in the Z-axis direction. Thus, the protrusion 61 does not protrude in the −Z direction from a back surface 50*b*, which is an end surface of the base section 50 in the −Z direction. That is, the protrusion 61 is disposed so as not to protrude from the outer shape of the base section 50. Thus, when the T-shirt Ma is set on the platen 30, the T-shirt Ma can be smoothly set without being caught.

Note that the elongated hole 55 and the protrusion 61 configure the guide mechanism of the guide section 70 (to be described later).

The +Z direction end face of the base section 50 has the slide surface 50*a* that is parallel to the support surface 41. The slide surface 50*a* is a substantially flat surface. Then, the moving section 60 moves with respect to the base section 50 along the slide surface 50*a* in a state where the slide surface 50*a* of the base section 50 and the −Z direction end surface of the moving section 60 (main body section 60*a*) are in contact with each other. Accordingly, it is possible to smoothly move the moving section 60 with respect to the base section 50. Further, by configuring the moving section 60 so as to be movable with respect to the base section 50, it is possible to displace the entire length dimension of the platen 30 in the direction along the Y-axis, and the medium M (T-shirt Ma) of various sizes can be set on the platen 30 without being loosened.

Next, the configuration of the engagement mechanism in the guide section 70 will be described.

Figure 4A:
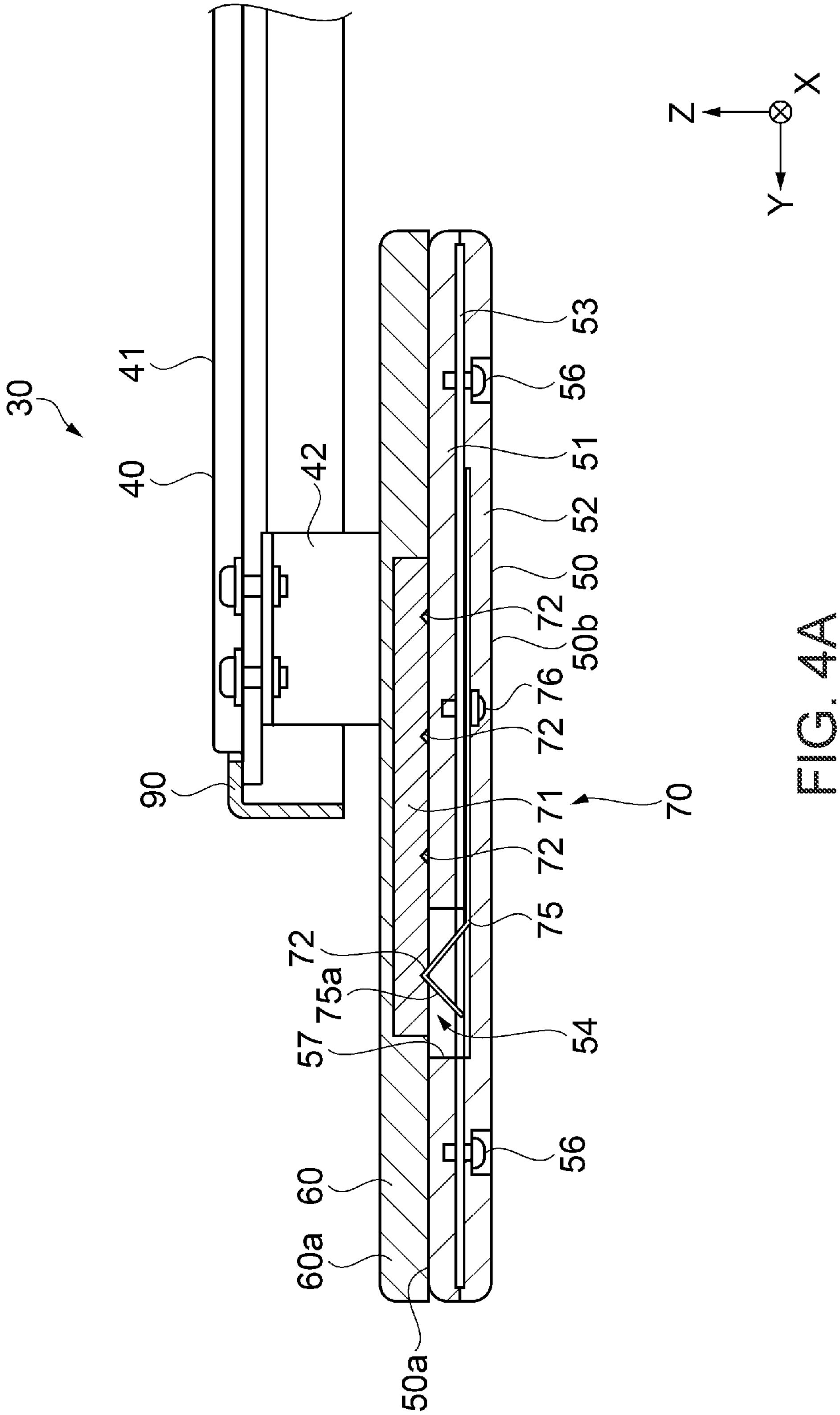
FIG. 4A is a cross-sectional view showing a configuration of an engagement mechanism in a guide section.

As shown in FIG. 4A, the engagement mechanism of the guide section 70 includes a recess section forming section having a plurality of recess sections 72 formed along the Y-axis, which is the movement direction of the moving section 60, and an engagement section that engages with the recess sections 72.

In this embodiment, a guide plate 71 having the plurality of recess sections 72 as the recess section forming section is disposed on the moving section 60, and a leaf spring 75 engaging with the recess sections 72 as the engagement sections are disposed on the base section 50.

The engagement mechanism of the guide section 70 is incorporated so as to not protrude from the outer shapes of the base section 50 and the moving section 60. Specifically, the guide section 70 is incorporated inside the base section 50 and the moving section 60. That is, the engagement mechanism of the guide section 70 does not have a protruding portion or the like that protrudes from the outer shapes of the base section 50 and the moving section 60. A specific description is given below.

The guide plate 71 is a plate-like member that extends in the direction along the Y-axis. The guide plate 71 is disposed at the center portion of the main body section 60*a* in the direction along the Y-axis. A recess section which is recessed in the +Z direction is formed in the −Z direction end surface of the main body section 60*a*, and the guide plate 71 is accommodated in the recess section. The guide plate 71 is fixed to the main body section 60*a* by a screw or the like. It is desirable that the −Z direction end face of the main body section 60*a* and the −Z direction end surface of the guide plate 71 form a continuous flat surface without a step.

The plurality of recess sections 72 recessed in the +Z direction are formed in the −Z direction end surface of the guide plate 71. The plurality of recess sections 72 are aligned in the direction along the Y-axis. The plurality of recess sections 72 are, for example, equally spaced along the Y-axis. The recess sections 72 are provided in a manner corresponding to, for example, the size of the T-shirt Ma to be printed. In the present embodiment, four recess sections 72 are formed corresponding to four sizes (for example, S size, M size, L size, and XL size) of the T-shirt Ma. Each recess 72 is formed in a V-shape.

The leaf spring 75 is accommodated inside the base section 50. The base section 50 is configured with a three layer structure. Specifically, the base section 50 includes a first base board 51, a second base board 52 disposed below the first base board 51, and an intermediate base board 53 disposed between the first base board 51 and the second base board 52. The first base board 51 and the second base board 52 are plate-like members formed of a plastic member. The intermediate base board 53 is a sheet metal. Providing the base section 50 with the three layer structure can increase the rigidity of the base section 50 while reducing the weight of the base section 50.

The first base board 51, the second base board 52, and the intermediate base board 53 are integrated by being fastened by a plurality of screws 56 as fastening members. In the present embodiment, the second base board 52 is fastened to the first base board 51 with the screws 56. A portion of the back surface 50*b*, which is an end surface in the −Z direction of the second base board 52, corresponding to the head portion of the screw 56 is subjected to a counterbore treatment. Therefore, the head portion of the screw 56 does not protrude from the back surface 50*b* in the −Z direction.

The leaf spring 75 is a thin plate material extending in the direction along the Y-axis. The leaf spring 75 is disposed to face the guide plate 71. The thin plate material is bent along the X-axis at the tip end portion in the +Y direction of the leaf spring 75, and a convex section 75*a* projecting in the +Z direction is formed. The −Y direction side of the leaf spring 75 with respect to the convex section 75*a* has a flat plate-shape. A recess section that is recessed in the −Z direction is formed in a +Z direction end surface of the second base board 52. The distance dimension of the recess section in the direction along the Z-axis is substantially the same as the thickness of the leaf spring 75. The flat plate-shaped portion of the leaf spring 75 is accommodated in the recess section formed in the +Z direction end face of the second base board 52. A central portion of the flat plate-shaped portion of the leaf spring 75 in the direction along the Y-axis is fastened to the first base board 51 via the intermediate base board 53 by a screw 76. A portion fastened by the screw 76 serves as a fixed end of the leaf spring 75. The lower portions of the leaf spring 75 and the screw 76 are covered by the second base board 52. Thus, the leaf spring 75 can be accommodated in the base section 50. Further, the screw 76 is disposed so as to not protrude from the outer shape of the second base board 52.

In a state where the base section 50 and the moving section 60 are fitted to each other, the guide section 70 is accommodated inside the base section 50 and the moving section 60. That is, the guide section 70 is incorporated into the inside of the base section 50 and the moving section 60 so as to not protrude from the outer shapes of the base section 50 and the moving section 60.

Since the engagement mechanism of the guide section 70 is configured not to protrude from the outer shapes of the base section 50 and the moving section 60 and no protrusion or the like protruding outward from the back surface 50*b* of the base section 50 is formed, the medium M (T-shirt Ma) can be smoothly set without being caught when the medium M is set on the platen 30. Furthermore, damage to the medium M and the like can be suppressed.

The convex section 75*a*, which is an end portion in the +Y direction of the leaf spring 75, is a free end (acting end). A hole section 57 extending to the slide surface 50*a* is formed in a peripheral region of the convex section 75*a* of the first base board 51 and the intermediate base board 53 of the base section 50. The hole section 57 serves as a spatial region, and the convex section 75*a* of the leaf spring 75 can be freely displaced in the directions along the Z-axis and the Y-axis.

An end portion in the +Z direction of the convex section 75*a* of the leaf spring 75 forms a V-shape and is engaged with the concave portion 72 of the guide plate 71. The end portion in the +Z direction of the convex section 75*a* of the leaf spring 75 protrudes from the slide surface 50*a* in the +Z direction in a no-load state with respect to the convex section 75*a*. Accordingly, the end portion in the +Z direction of the convex section 75*a* of the leaf spring 75 can be engaged with the recess section 72. The convex section 75*a* of the leaf spring 75 is engaged with the recess section 72, which facilitates holding of the position of the moving section 60 relative to the base section 50.

In the present embodiment, two pairs of the guide plate 71 and the leaf spring 75 configuring the guide section 70 are disposed. Specifically, the pair of the guide plate 71 and the leaf spring 75 constituting the guide portion 70 is disposed in each of the +X direction and the −X direction with respect to the central portion of the base section 50 and the moving section 60 in the direction along the X-axis (FIG. 3B). Each pair of the guide plate 71 and the leaf spring 75 is disposed at a position symmetrical with respect to the center line of the base section 50 and the moving section 60. Accordingly, when the moving section 60 is moved with respect to the base section 50, a load balance of the moving section 60 in the +X direction and the −X direction is achieved, and the moving section 60 can be smoothly moved. That is, for example, even in a case where a load is applied to any one of the +X direction and the −X direction of the moving section 60 when the moving section 60 is moved, the load applied to one direction is alleviated by the two guide sections 70 (the pair of the guide plate 71 and the leaf spring 75), and thus it is possible to smoothly move the moving section 60.

Next, operation of the engagement mechanism in the guide section 70 will be described.

In the guide section 70 of the present embodiment, since the four recess sections 72 are disposed in parallel in the direction along the Y-axis in the guide plate 71, the moving section 60 can be displaced in four stages in the direction along the Y-axis with respect to the base section 50.

FIG. 4A shows a state in which the convex section 75*a* of the leaf spring 75 is engaged with the recess section 72 disposed at the most +Y direction side among the four concave portions 72. That is, it shows a state in which the moving section 60 is positioned closest to the base section 50 side and a state in which the entire length dimension of the platen 30 in the direction along the Y-axis is in a state of being shortest.

The recess section 72 disposed on the most +Y direction side in the guide plate 71 is referred to as a first recess section 72, the recess section 72 adjacent to the first recess section 72 in the −Y direction is referred to as a second recess section 72, the recess section 72 adjacent to the second recess section 72 in the −Y direction is referred to as a third recess section 72, and the recess section 72 adjacent to the third recess section 72 in the −Y direction is referred to as a fourth recess section 72.

A state in which the convex section 75*a* of the leaf spring 75 is engaged with the first recess section 72 is a state in which the moving section 60 is positioned at a first stage, and a state in which the convex section 75*a* of the leaf spring 75 is engaged with the second recess section 72 is a state in which the moving section 60 is positioned at a second stage. A state in which the convex section 75*a* of the leaf spring 75 is engaged with the third recess section 72 is a state in which the moving section 60 is positioned at a third stage, and a state in which the convex section 75*a* of the leaf spring 75 is engaged with the fourth recess section 72 is a state in which the moving section 60 is positioned at a fourth stage.

Next, a case where the moving section 60 is moved from the first stage to the second stage in the +Y direction with respect to the base section 50 will be described.

Figure 4B:
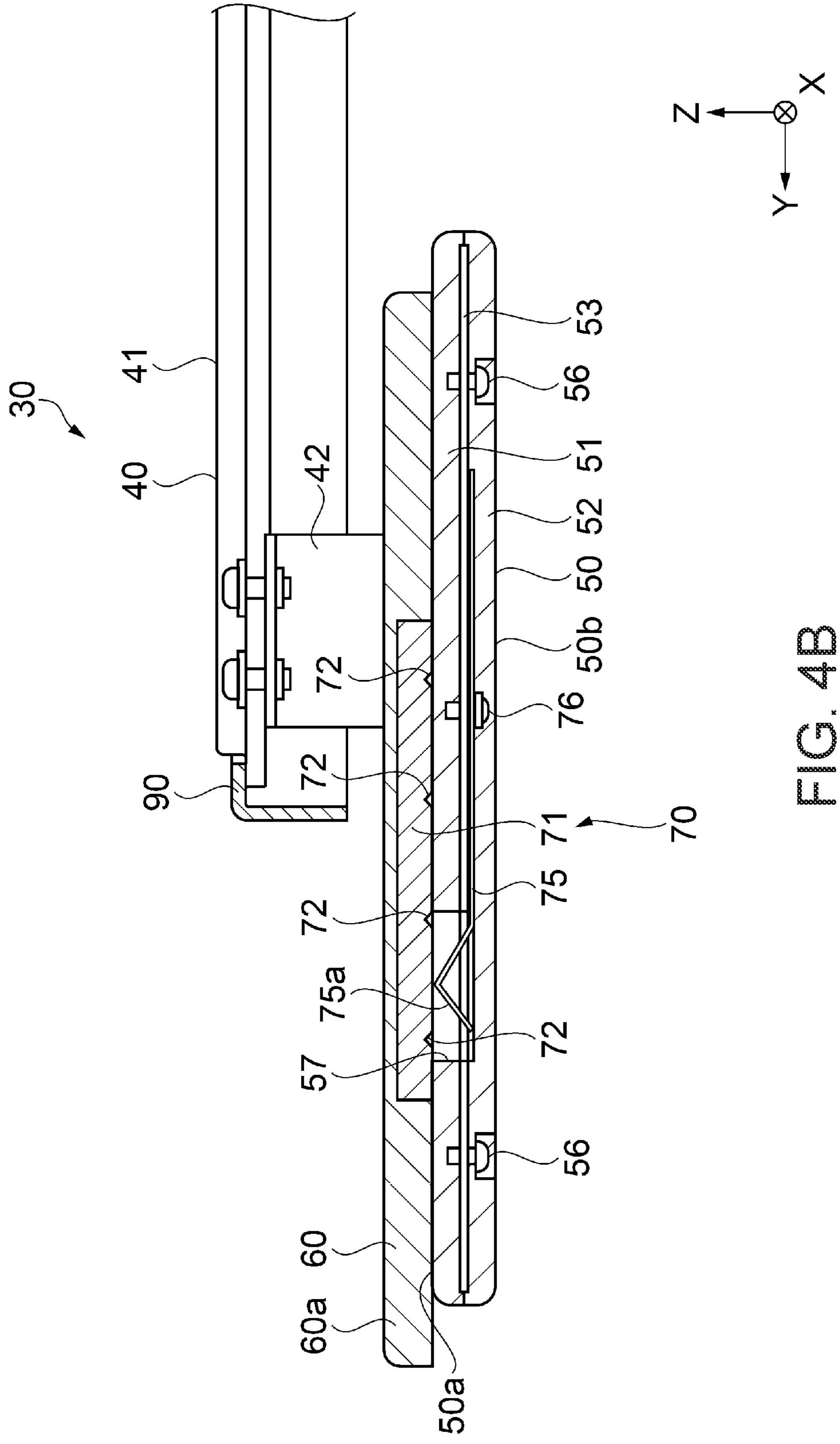
FIG. 4B is a cross-sectional view showing a configuration of the engagement mechanism in the guide section.

In this case, a finger is put on the main body section 60*a* of the moving section 60 to press the moving section 60 in the +Y direction. Then, as shown in FIG. 4B, the moving section 60 moves in the +Y direction along the slide surface 50*a* of the base section 50. At this time, since the guide plate 71 moves in the +Y direction with respect to the leaf spring 75, the convex section 75*a* of the leaf spring 75 is disengaged from the first recess section 72. When the leaf spring 75 is disengaged from the first recess section 72, the convex section 75*a* is displaced downward, and the end portion in the +Z direction of the convex section 75*a* is in contact with the −Z direction end surface (flat surface) of the guide plate 71. That is, the convex section 75*a* is biased downward by the −Z direction end surface of the guide plate 71, and the upward displacement of the convex section 75*a* is restricted.

Here, in a case where the moving section 60 is moved in the +Y direction with respect to the base section 50, when the convex section 75*a* of the leaf spring 75 is disengaged from the recess section 72, since the convex section 75*a* of the leaf spring 75 is displaced by a load applied in a direction extending in the +Y direction from the fixed end of the leaf spring 75, the convex section 75*a* moves downward easily. Therefore, a load applied to the moving section 60 of the leaf spring 75 becomes relatively small. Therefore, the movement of the moving section 60 in the +Y direction can be easily performed without a large load.

Figure 4C:
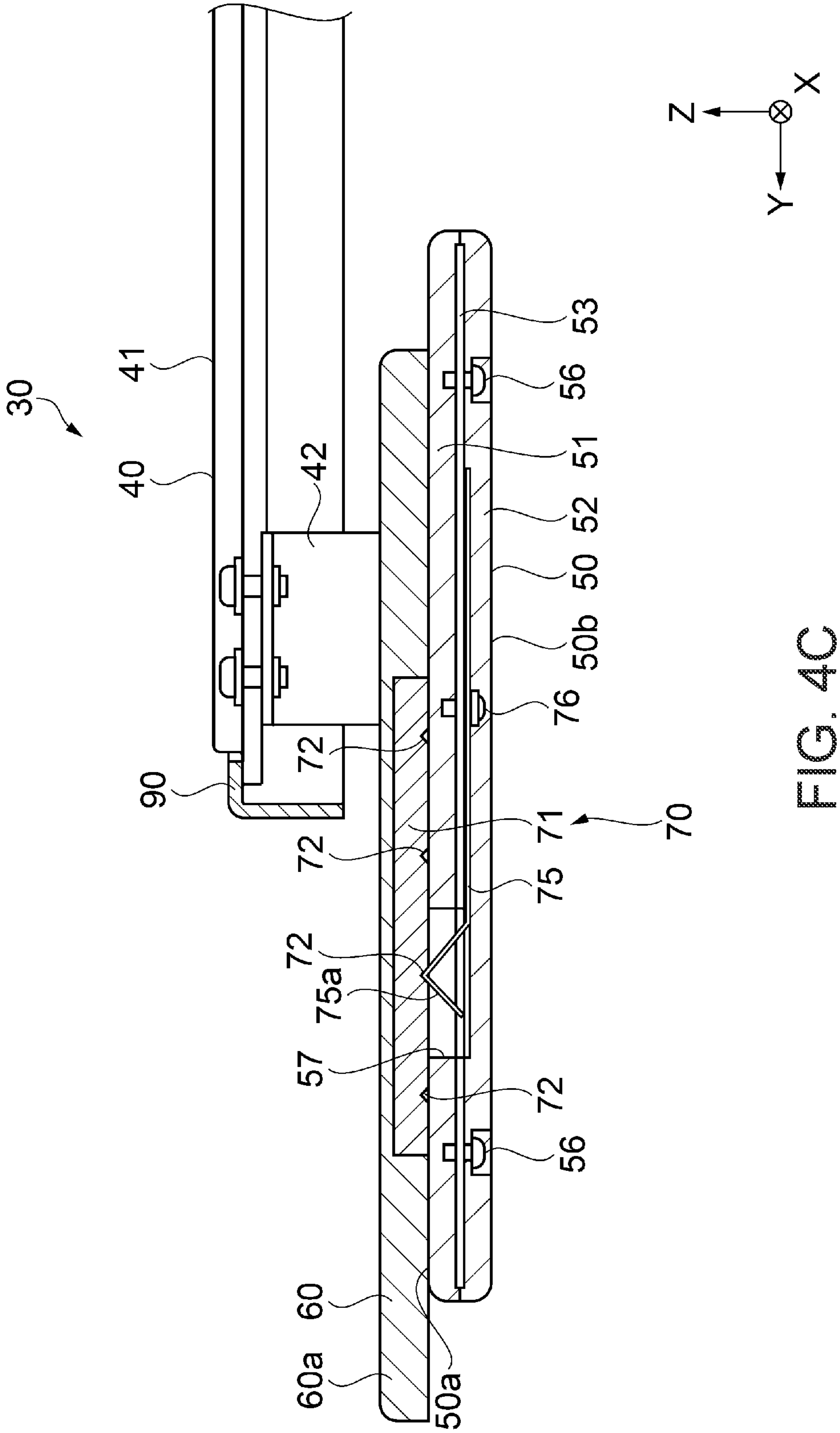
FIG. 4C is a cross-sectional view showing a configuration of the engagement mechanism in the guide section.

Next, the moving section 60 is further pressed in the +Y direction. Then, as shown in FIG. 4C, since the guide plate 71 further moves in the +Y direction with respect to the leaf spring 75, the end portion in the +Z direction of the convex section 75*a* of the leaf spring 75 engages with the second recess section 72. Thus, the moving section 60 can be moved to the second stage.

Here, when the convex section 75*a* of the leaf spring 75 is engaged with the second recess section 72, the convex section 75*a* of the leaf spring 75 is released from the restriction state of movement due to contact with the −Z direction end face of the guide plate 71. Then, the convex section 75*a* is in contact with the second recess section 72 by the repulsive force directed upward of the convex section 75*a*. Thus, when the convex section 75*a* of the leaf spring 75 is engaged with the second recess section 72, a click feeling can be obtained. The moving position of the moving section 60 can be easily visually checked by the click feeling.

When the moving section 60 is moved from the second stage to the third stage in the +Y direction with respect to the base section 50, in the same manner as described above, a finger is put on the main body section 60*a* of the moving section 60 and the moving section 60 is pressed in the +Y direction. As a result, the convex section 75*a* of the leaf spring 75 is disengaged from the second recess section 72 and then engaged with the third recess section 72. Then, by obtaining the click feeling when the leaf spring 75 is engaged with the third recess section 72, it is possible to visually check that the moving section 60 is moved to the third stage.

Furthermore, when the moving section 60 is moved to the fourth stage from the third stage in the +Y direction with respect to the base section 50, in the same manner as described above, a finger is put on the main body section 60*a* of the moving section 60 and the moving section 60 is pressed in the +Y direction. As a result, the convex section 75*a* of the leaf spring 75 is disengaged from the third recess section 72 and then engaged with the fourth recess section 72. Then, by obtaining the click feeling when the leaf spring 75 is engaged with the fourth recess section 72, it is possible to visually check that the moving section 60 is moved to the fourth stage.

For example, it is possible to easily visually check the moving position of the moving section 60 by the number of times the click feeling is obtained.

Figure 4D:
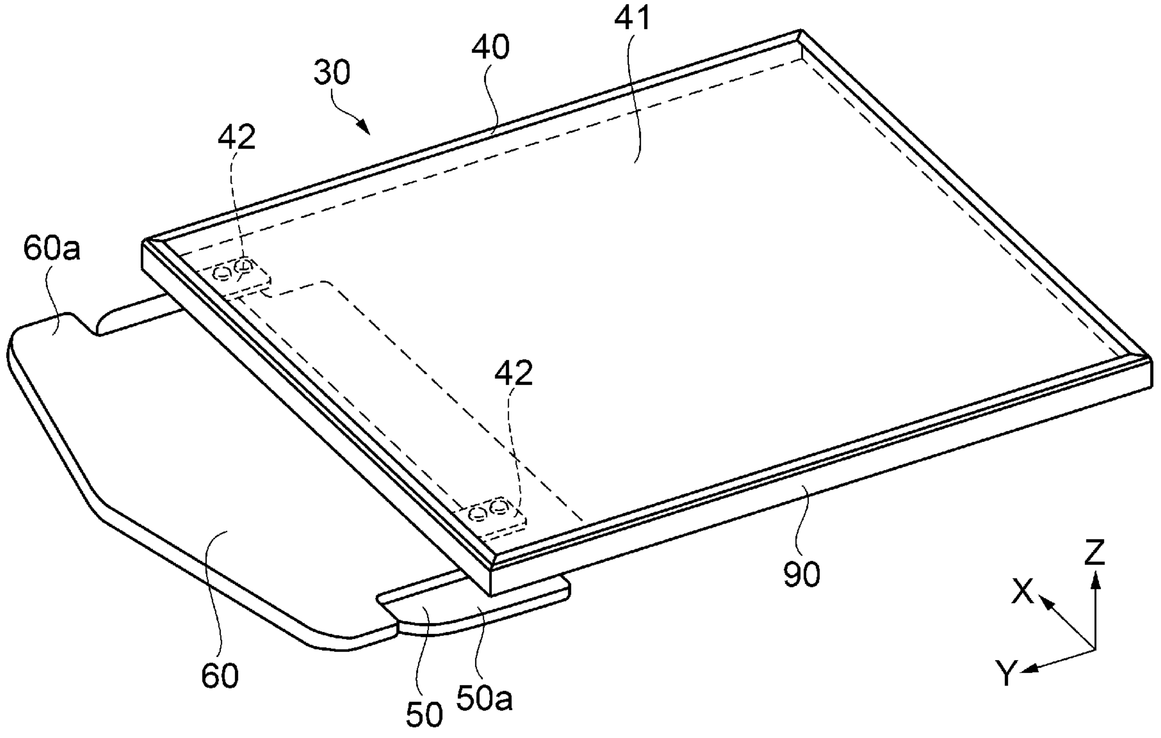
FIG. 4D is a perspective view showing a configuration of the engagement mechanism in the guide section.

FIG. 4D shows a state in which the convex section 75*a* of the leaf spring 75 is engaged with the fourth recess section 72. That is, it shows the +Y direction end portion of the moving section 60 is in a state of being farthest from the +Y direction end portion of the base section 50 and the entire length dimension of the platen 30 in the direction along the Y-axis is in a state of being longest.

Next, a case where the moving section 60 is moved in the −Y direction with respect to the base section 50 will be described. For example, a case where the moving section 60 is moved from the second stage to the first stage with respect to the base section 50 will be described.

First, a finger is put on the main body section 60*a* of the moving section 60 to press the moving section 60 in the −Y direction. The moving section 60 moves in the −Y direction along the slide surface 50*a* of the base section 50. Then, since the guide plate 71 moves in the −Y direction with respect to the leaf spring 75, the convex section 75*a* of the leaf spring 75 is disengaged from the second recess section 72. When the leaf spring 75 is disengaged from the second recess section 72, the convex section 75*a* is displaced downward, and the end portion in the +Z direction of the convex section 75*a* is in contact with the −Z direction end surface of the guide plate 71. That is, the convex section 75*a* is biased downward by the −Z direction end surface of the guide plate 71, and the upward movement of the convex section 75*a* is restricted.

Here, in a case where the moving section 60 is moved in the −Y direction with respect to the base section 50, when the convex section 75*a* of the leaf spring 75 is disengaged from the recess section 72, a load is applied to the convex section 75*a* of the leaf spring 75 in a direction in which the convex section 75*a* is contracted toward the fixed end of the leaf spring 75, and the convex section 75*a* is displaced. The load for displacing the convex section 75*a* of the leaf spring 75 in the contracting direction (−Y direction) becomes larger than the load for displacing the convex section 75*a* of the leaf spring 75 in the extending direction from the fixed end in the +Y direction. For this reason, when the moving section 60 is moved in the −Y direction, the load is increased, so that a constant restricting force is generated.

Next, the moving section 60 is further pressed in the −Y direction. Accordingly, since the guide plate 71 further moves in the −Y direction with respect to the leaf spring 75, the end portion in the +Z direction of the convex section 75*a* of the leaf spring 75 engages with the first recess section 72. Accordingly, the moving section 60 can be moved to the first stage position with respect to the base section 50.

Here, when the convex section 75*a* of the leaf spring 75 is engaged with the first recess section 72, the convex section 75*a* of the leaf spring 75 is released from the restriction state of the movement due to the contact with the −Z direction end face of the guide plate 71. Then, the convex section 75*a* is in contact with the first recess section 72 by the repulsive force directed upward of the convex section 75*a*. Thus, when the convex section 75*a* of the leaf spring 75 is engaged with the first recess section 72, a click feeling can be obtained. The moving position of the moving section 60 can be easily visually checked by the click feeling.

The same applies to a case where the moving section 60 is moved from the fourth stage to the third stage in the −Y direction with respect to the base section 50 and a case where the moving section 60 is moved from the third stage to the second stage.

In addition, for example, it is possible to easily visually check the moving position of the moving section 60 by the number of times the click feeling is obtained.

As described above, when the moving section 60 moves in the −Y direction with respect to the base section 50, the load is larger than when the moving section 60 moves in the +Y direction with respect to the base section 50. In the present embodiment, since two leaf springs 75 are disposed, the load is further increased. Therefore, for example, even if the moving section 60 is slightly pressed in the −Y direction while the T-shirt Ma is setting with the moving section 60 at the second stage position, it is possible to make it difficult for the moving section 60 to move in the −Y direction (the direction of the first stage position). Thus, the T-shirt Ma can be smoothly set on the platen 30 at the second stage position. In addition, since the moving section 60 is held at a predetermined position, for example, it is easy to hold the printing position of each T-shirt Ma of each lot, and it is possible to reduce the variation of the printing position in the lot.

Next, the configuration of the guide mechanism in the guide section 70 will be described.

Figure 5A:
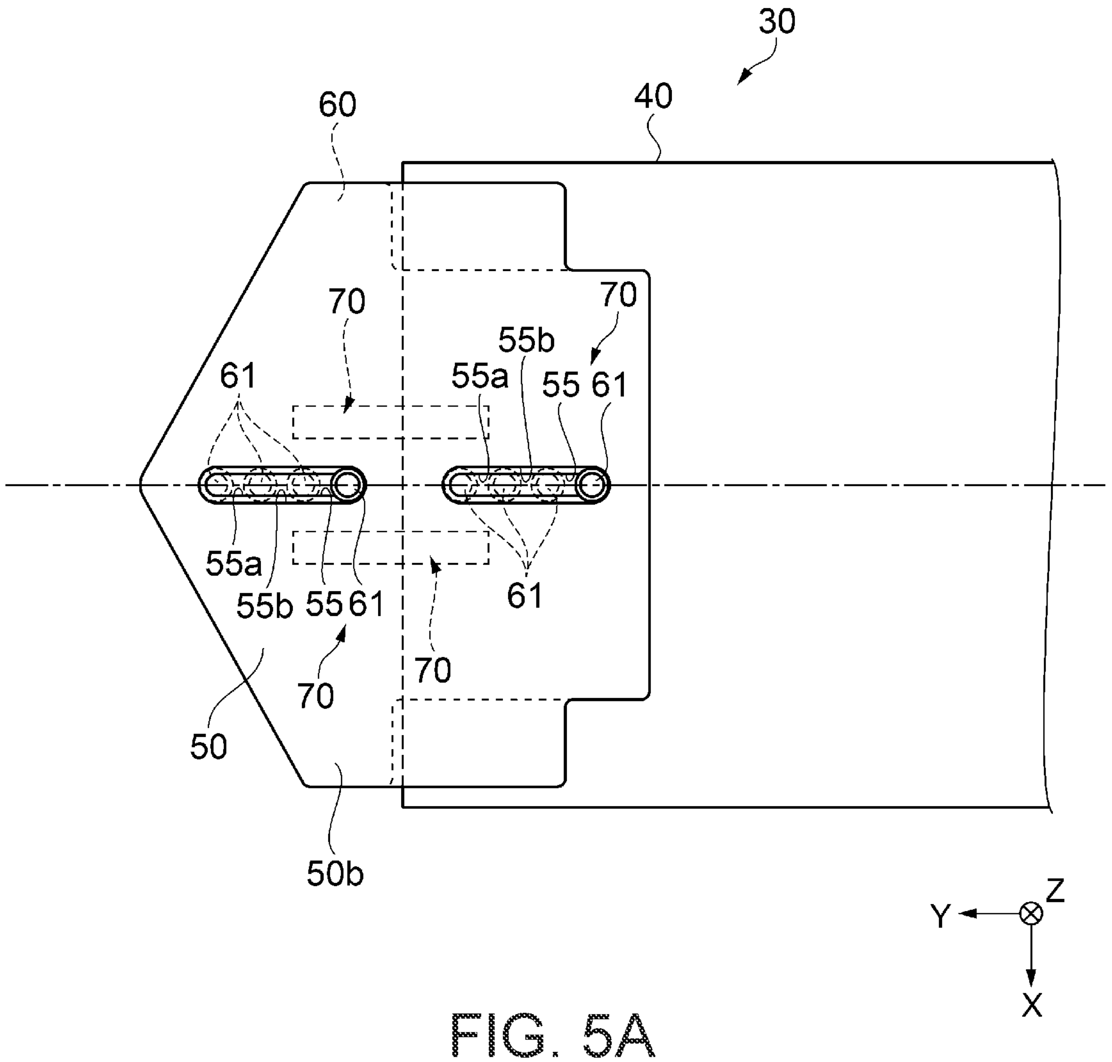
FIG. 5A is a bottom view showing a configuration of the guide mechanism in the guide section.
Figure 5B:
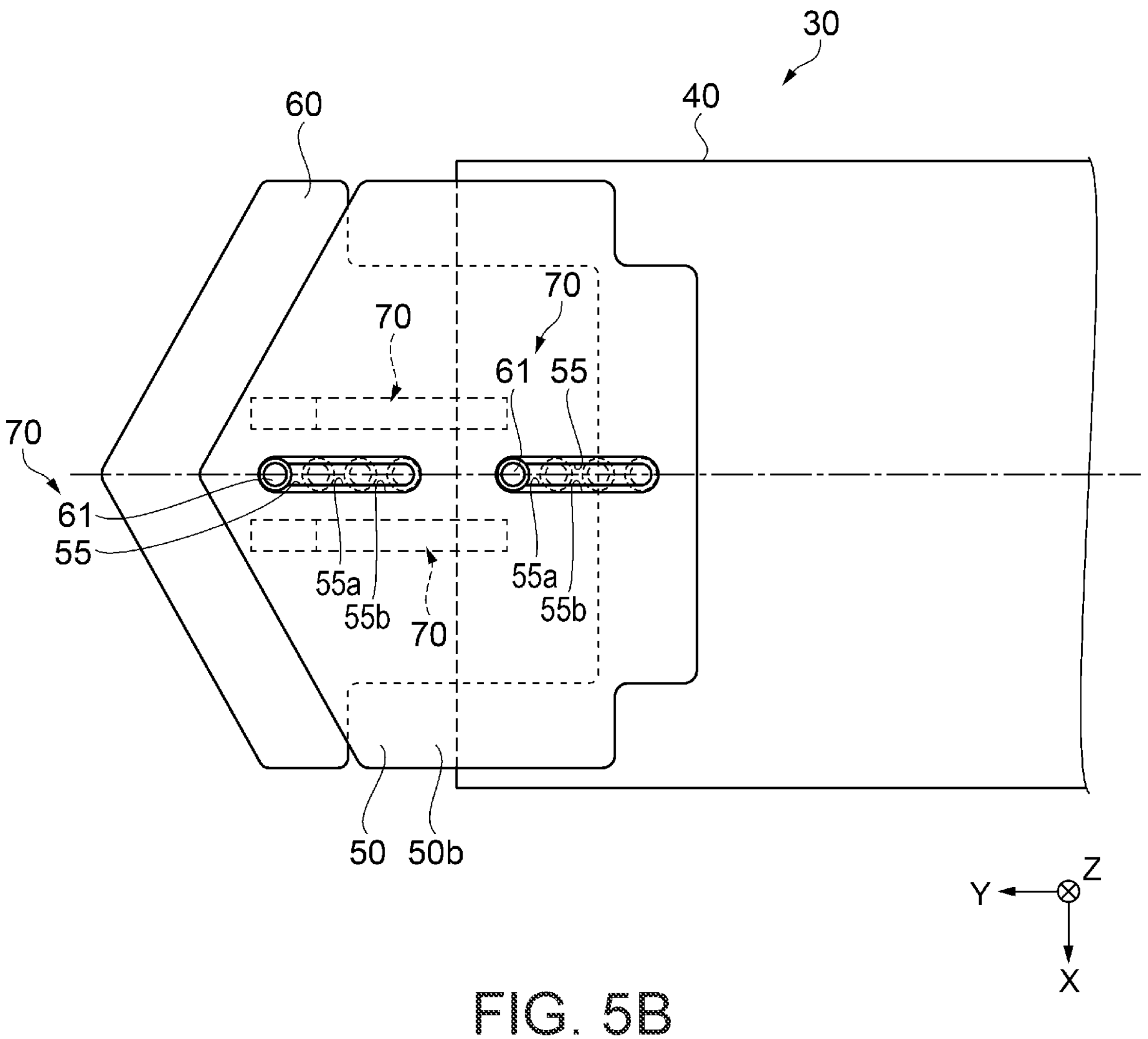
FIG. 5B is a bottom view showing a configuration of the guide mechanism in the guide section.

As shown in FIGS. 5A and 5B, the guide mechanism of the guide section 70 includes the protrusion 61 provided on the moving section 60, and the protrusion 61 is fitted into the elongated hole 55 formed in the base section 50 along the moving direction of the moving section 60. The protrusion 61 is movable along the elongated hole 55 in accordance with the movement of the moving section 60. The protrusion 61 may be formed integrally with the moving section 60 or may be a member attached to the moving section 60.

The guide mechanism of the guide section 70 is incorporated so as to not protrude from the outer shapes of the base section 50 and the moving section 60. Specifically, the guide section 70 is incorporated inside the base section 50 and the moving section 60. That is, the guide mechanism of the guide section 70 does not have a protruding portion or the like that protrudes from the outer shapes of the base section 50 and the moving section 60.

The protrusion 61 can be moved along the elongated hole 55 by the guide mechanism of the guide section 70, and the moving section 60 can be moved with respect to the support section 40 and the base section 50. To be specific, in a state where the protrusion 61 is fitted in the elongated hole 55, the protrusion 61 is movable along the elongated hole 55 (first elongated hole 55*a*) (FIG. 3C). Thus, the moving section 60 can move in the direction in which the elongated hole 55 extends (the direction along the Y-axis).

In the guide mechanism of the guide section 70 of the present embodiment, two pairs of the elongated hole 55 and the protrusion 61 are disposed. Two elongated holes 55 are central portions in the direction along the X-axis of the base section 50, and are disposed in a straight line in the direction along the Y-axis.

The distance dimension of each elongated hole 55 in the direction along the Y-axis is the same. The distance dimension of the first elongated hole 55*a* of each elongated hole 55 in the direction along the Y-axis corresponds to the movable distance of the moving section 60 with respect to the base section 50. To be specific, the distance dimension of the first elongated hole 55*a* in the direction along the Y-axis is secured to be equivalent to at least the distance dimension between the first recess section 72 and the fourth recess section 72 in the Y-axis direction. Thus, the moving distance of the moving section 60 in four stages can be secured. Further, the movement limit position of the moving section 60 in the +Y direction and the movement limit position of the moving section 60 in the −Y direction is restricted by the distance dimension of the first elongated hole 55*a* in the direction along the Y-axis.

FIG. 5A shows the position of the protrusion 61 in the elongated hole 55 when the convex section 75*a* of the leaf spring 75 is engaged with the first recess section 72. At this time, each of the protrusions 61 is located at the −Y direction end portion of each of the elongated holes 55. Then, when the moving section 60 is moved in the +Y direction and the convex section 75*a* of the leaf spring 75 moves to the second recess section 72 side, each protrusion 61 moves in the +Y direction along each elongated hole 55 (first elongated hole 55*a*) in accordance with the movement of the moving section 60.

FIG. 5B shows the position of the protrusion 61 in the elongated hole 55 when the convex section 75*a* of the leaf spring 75 is engaged with the fourth recess section 72. At this time, each of the protrusions 61 is located at the +Y direction end portion of each of the elongated holes 55.

Two elongated holes 55 are disposed in the direction along the Y-axis at the central portion of the base section 50 in the direction along the X-axis, and one protrusion 61 is arranged for each elongated hole 55. For this reason, for example, even in a case where the moving section 60 is moved in the +Y direction in a state where the moving section 60 is pressed from the oblique direction, since the pressing load of each protrusion 61 with respect to each elongated hole 55 is dispersed, it is possible to prevent the protrusion 61 from being caught by the elongated hole 55 and the moving section 60 from not moving in the middle of the movement of the moving section 60. That is, even if a load is applied to one end side of the moving section 60, the moving section 60 can be smoothly moved (guided).

Further, even when the moving distance of the moving section 60 is relatively long or the moving speed of the moving section 60 with respect to the base section 50 is increased, the moving section 60 can be smoothly moved.

In addition, as described above, the end portion in the −Z direction of the protrusion 61 does not protrude from the back surface 50*b* of the base section 50 (FIG. 3C). Therefore, when the medium M (T-shirt Ma) is set on the platen 30, the medium M can be smoothly set without being caught. Furthermore, damage to the medium M and the like can be suppressed.

The moving section 60 and the base section 50 are fitted to each other by the two protrusions 61. That is, the moving section 60 and the base section 50 are fitted to each other at two different positions in the direction along the Y-axis. As a result, the load applied to each of the protrusions 61 is reduced, and a stable fitting state can be maintained between the moving section 60 and the base section 50.

In the present embodiment, a configuration may be two elongated holes 55 connected to form one elongated hole 55 and adopted in which two protrusions 61 positioned at spaces are fitted into the one elongated hole 55.

Next, the configuration of the position indicator of the platen 30 will be described.

The position indicator of the platen 30 is a mechanism that indicates the position of the moving section 60 with respect to the base section 50.

In the position indicator, one of the base section 50 and the moving section 60 is provided with a position mark 80 indicating a position of the moving section 60 relative to the base section 50, and the other of the base section 50 and the moving section 60 is provided with a visual check section 81 through which the position mark 80 can be visually checked.

Figure 6A:
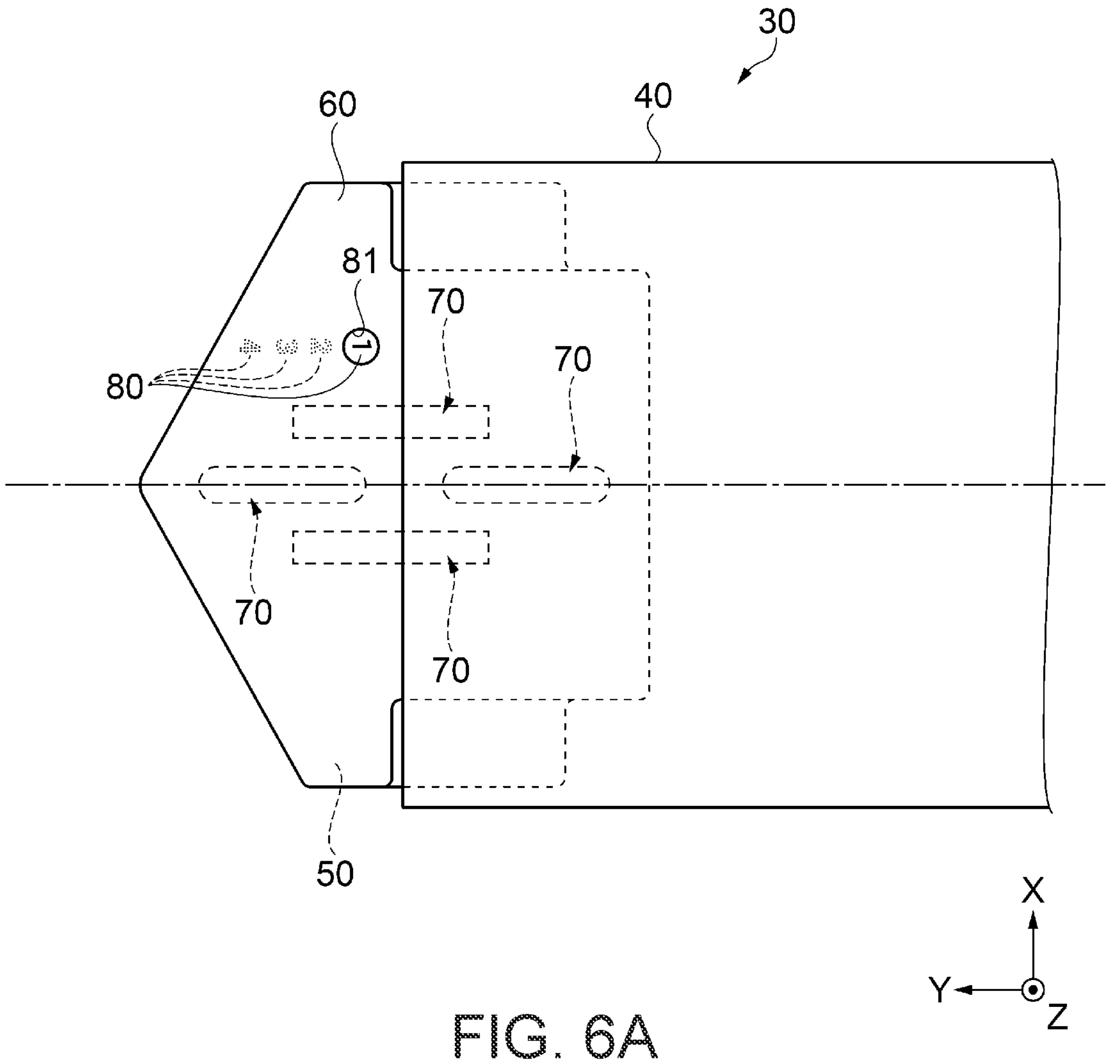
FIG. 6A is a plan view showing a configuration of a position indicator of a platen.
Figure 6B:
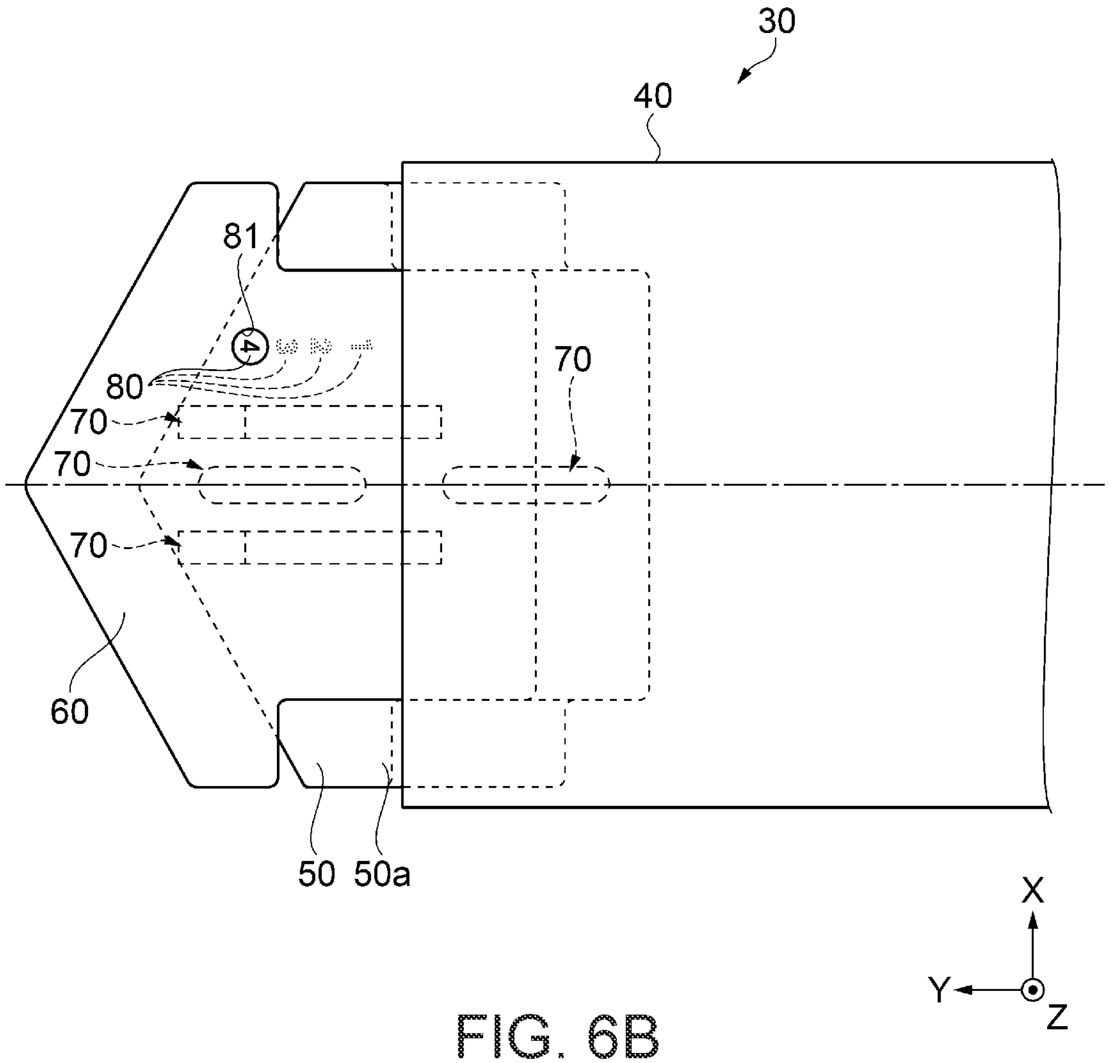
FIG. 6B is a plan view showing a configuration of the position indicator of the platen.

As shown in FIGS. 6A and 6B, in the present embodiment, the base section 50 is provided with the position mark 80, and the moving section 60 is provided with the visual check section 81.

The position mark 80 is disposed on the slide surface 50*a* of the base section 50. The position mark 80 is formed corresponding to the position of each recess section 72 of the guide section 70. The position mark 80 is formed of a number, a symbol, an image, or the like. When the position mark 80 is a number, it is formed, for example, as “1”, “2”, “3”, “4”, . . . , etc. When the position mark 80 is a symbol, it is formed, for example, as “S”, “M”, “L”, “XL”, . . . , etc. When the position mark 80 is an image, it is formed, for example, as a circle mark, a triangle mark, or the like.

Since the moving section 60 of the present embodiment is configured to move in four stages with respect to the base section 50, the position mark 80 is formed of, for example, four different numbers (“1”, “2”, “3”, and “4”). Four numbers of the position mark 80 are arranged in parallel in the direction along the Y-axis. Further, when the user views the position mark 80 in the −Z direction in a state where the user faces the platen 30 in the +Y direction, the position mark 80 is formed such that the direction of the mark of each position mark 80 is the +Y direction. Thus, the user can easily visually check each position mark 80.

The distance dimension between the adjacent numbers (“1”, “2”, “3”, and “4”) in the position mark 80 is the same as the distance dimension between the recesses 72 provided in the guide plate 71. “1” of the position mark 80 corresponds to a state in which the convex section 75*a* of the leaf spring 75 is engaged with the first recess section 72. That is, this corresponds to a state in which the moving section 60 is positioned at the first stage. “2” of the position mark 80 corresponds to a state in which the convex section 75*a* of the leaf spring 75 is engaged with the second recess section 72. That is, this corresponds to a state in which the moving section 60 is positioned at the second stage. “3” of the position mark 80 corresponds to a state in which the convex section 75*a* of the leaf spring 75 is engaged with the third recess section 72. That is, this corresponds to a state in which the moving section 60 is positioned at the third stage. “4” of the position mark 80 corresponds to a state in which the convex section 75*a* of the leaf spring 75 is engaged with the fourth recess section 72. That is, this corresponds to a state in which the moving section 60 is positioned at the fourth stage.

The visual check section 81 is for specifying any one of the plurality of numerals of the position mark 80. The visual check section 81 of the present embodiment is a circular opening section in a plan view, and is, for example, a through hole formed in a direction along the Z-axis of the moving section 60. Note that the visual check section 81 may be a window section formed of a film or the like having translucency.

The visual check section 81 moves with the movement of the moving section 60, and identifies the position of the moving section 60 by visually checking any of the plurality of numbers of the position mark 80 via the visual check section 81. For example, when the moving section 60 moves to the first stage with respect to the base section 50, the visual check section 81 is positioned above “1” of the position mark 80 (FIG. 6A). The user can easily visually check the position of the moving section 60 via the visual check section 81 by looking at the moving section 60 in the −Z direction. Specifically, it is possible to easily visually check a state in which the moving section 60 is at the position of the first stage and the entire length dimension of the platen 30 in the direction along the Y-axis is the shortest.

In addition, when the moving section 60 is moved in the +Y direction and the moving section 60 is positioned at the second stage relative to the base section 50 from the state where the moving section 60 is positioned at the first stage, the visual check section 81 is positioned above “2” of the position mark 80. The user can easily visually check the position of the moving section 60 via the visual check section 81 by looking at the moving section 60 in the −Z direction. Specifically, it is possible to easily visually check a state in which the moving section 60 is at the position of the second stage.

In addition, when the moving section 60 is moved in the +Y direction and the moving section 60 is positioned at the third stage relative to the base section 50 from the state where the moving section 60 is positioned at the second stage, the visual check section 81 is positioned above “3” of the position mark 80. The user can easily visually check the position of the moving section 60 via the visual check section 81 by looking at the moving section 60 in the −Z direction. Specifically, it is possible to easily visually check a state in which the moving section 60 is at the position of the third stage.

In addition, when the moving section 60 is moved in the +Y direction and the moving section 60 is positioned at the fourth stage relative to the base section 50 from the state where the moving section 60 is positioned at the third stage, the visual check section 81 is positioned above "3" of the position mark 80 (FIG. 6B). The user can easily visually check the position of the moving section 60 via the visual check section 81 by looking at the moving section 60 in the −Z direction. Specifically, it is possible to easily visually check a state in which the moving section 60 is at the position of the fourth stage and the entire length dimension of the platen 30 in the direction along the Y-axis is the longest.

After confirming the position of the moving section 60 through the visual check section 81, the user sets the T-shirt Ma on the platen 30. In this case, since the T-shirt Ma is set in a state where the moving section 60 has confirmed a desired position, T-shirt Ma of the same lot can be set at the same position with high reproducibility, and even other T-shirt Ma in the same lot can continue to be printed at substantially the same position. Therefore, the productivity can be increased and the yield of the production of the printed T-shirt Ma can be improved.

Note that, for example, in a case where the moving section 60 is formed of a member having translucency, the visual check section 81 may be, for example, a circular shaped indicator section instead of a through hole. Thereby, the position of the moving section 60 can be visually checked by surrounding each number of the position mark 80 in the circle. Further, the visual check section 81 may have an arrow-like indication form. Also in this manner, each number of the position mark 80 is specified by the arrow, and thus the position of the moving section 60 can be visually checked. In addition, in a case where the moving section 60 is formed of a member having translucency, a configuration may be adopted in which the position mark 80 is provided in the moving section 60 and the visual check section 81 (for example, a circular shaped indicator section) is provided in the base section 50. Even in this case, it is possible to obtain the same effect as described above.

2. Second Embodiment

Next, a second embodiment will be described. Specifically, the configuration of the guide section 70A in the platen 30A will be described. The components other than the guide section 70A are the same as those of the first embodiment, and the same components as those of the first embodiment are denoted by the same reference symbols, and a duplicate description thereof will be omitted.

Figure 7A:
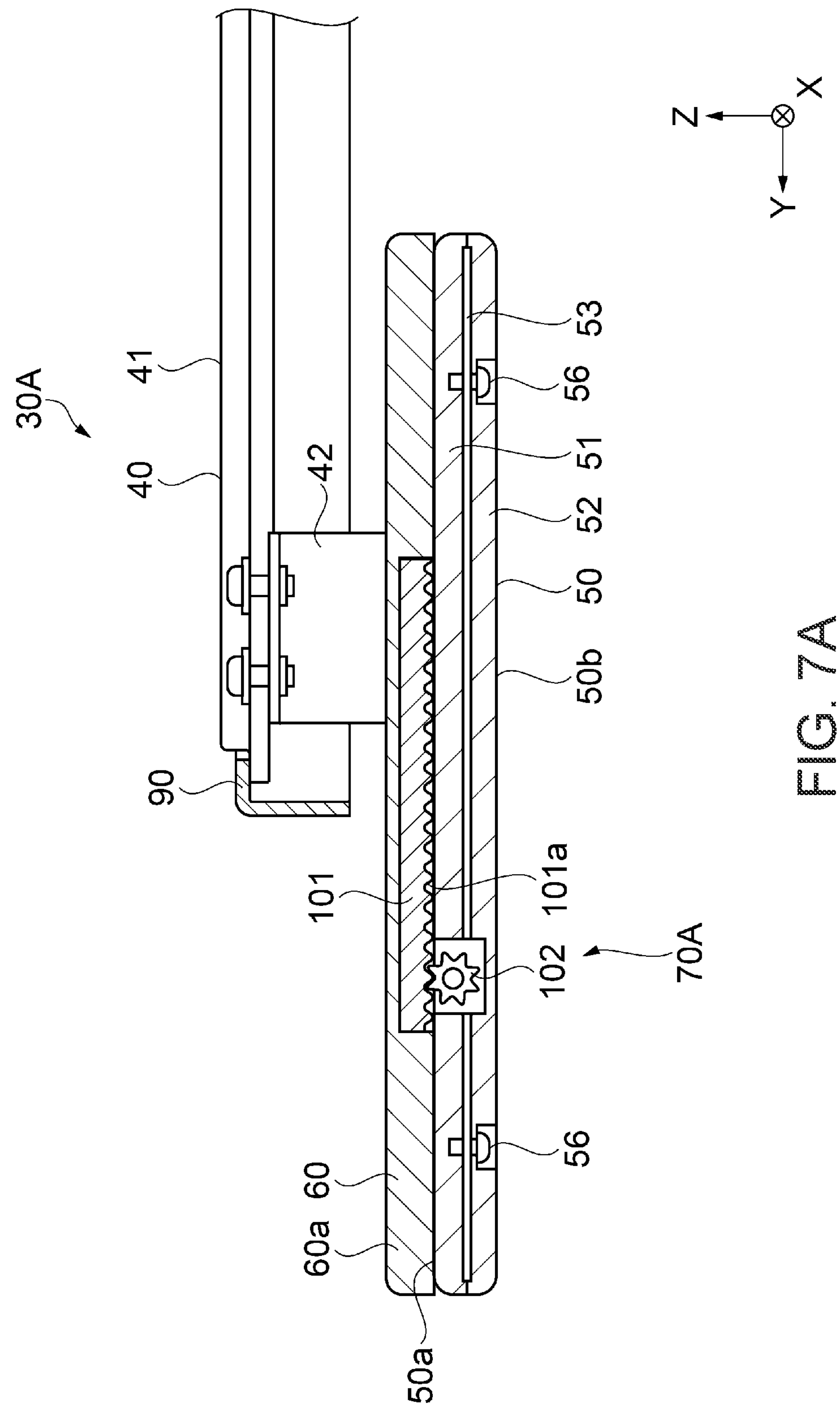
FIG. 7A is a sectional view showing a configuration of another guide section.

As shown in FIG. 7A, the guide section 70A includes a rack 101 as the recess section forming section having a plurality of recess sections 101*a* formed along the Y-axis that is the movement direction of the moving section 60, and a pinion 102 as the engagement section that engages with the recess sections 101*a*.

In this embodiment, the rack 101 is disposed on the moving section 60, and the pinion 102 is disposed on the base section 50.

The rack 101 is a plate-like member that extends in the direction along the Y-axis. The rack 101 is disposed at the center portion of the main body section 60*a* in the direction along the Y-axis. A recess section which is recessed in the +Z direction is formed on the −Z direction end surface of the main body section 60*a*, and the rack 101 is accommodated in the recess section. The rack 101 is fixed to the main body section 60*a* by a screw or the like. A plurality of recess sections 101*a* are disposed at the −Z direction end of the rack 101. The recess sections 101*a* are disposed at equally spaced in the direction along the Y-axis.

The pinion 102 is accommodated inside the base section 50. For example, it is attached to the intermediate base board 53. The pinion 102 is a gear engaged with the recess sections 101*a* of the rack 101. The pinion 102 includes a one-way torque damper. That is, the pinion 102 of the present embodiment generates a large torque only in one rotational direction. Specifically, the large torque is generated in the pinion 102 of the present embodiment in the clockwise direction in FIG. 7A. On the other hand, the torque in the counterclockwise direction is slight. Therefore, when the moving section 60 is moved in the +Y direction relative to the base section 50, the pinion 102 rotates counterclockwise rotation direction, thus allowing the moving section 60 to be moved with a small load. On the other hand, when the moving section 60 is moved in the −Y direction with respect to the base section 50, the pinion 102 rotates in the clockwise rotation direction, thus a large load is generated.

In a state where the base section 50 and the moving section 60 are fitted to each other, the guide section 70A is accommodated inside the base section 50 and the moving section 60. That is, the rack 101 and the pinion 102 are incorporated so as to not protrude from the outer shapes of the base section 50 and the moving section 60.

Further, in the present embodiment, two guide sections 70A are disposed. Specifically, the guide sections 70A are disposed in each of the +X direction and the −X direction with respect to the central portion of the base section 50 and the moving section 60 in the direction along the X-axis. The guide sections 70A are disposed at a position symmetrical with respect to the center line of the base section 50 and the moving section 60. Accordingly, when the moving section 60 is moved with respect to the base section 50, a load balance of the moving section 60 in the +X direction and the −X direction is achieved, and the moving section 60 can be smoothly moved. That is, for example, even in a case where a load is applied to any one of the +X direction and the −X direction of the moving section 60 when the moving section 60 is moved, the load applied to one direction is alleviated by the two guide sections 70A, and thus it is possible to smoothly move the moving section 60.

Next, the operation of the guide section 70A will be described.

FIG. 7A shows a state in which the pinion 102 is engaged with the recess section 101*a* at the most +Y direction end portion of the rack 101. That is, it shows a state in which the moving section 60 is positioned closest to the base section 50 side and a state in which the entire length dimension of the platen 30 in the direction along the Y-axis is in a state of being shortest.

Next, a case where the moving section 60 is moved in the +Y direction with respect to the base section 50 will be described.

Figure 7B:
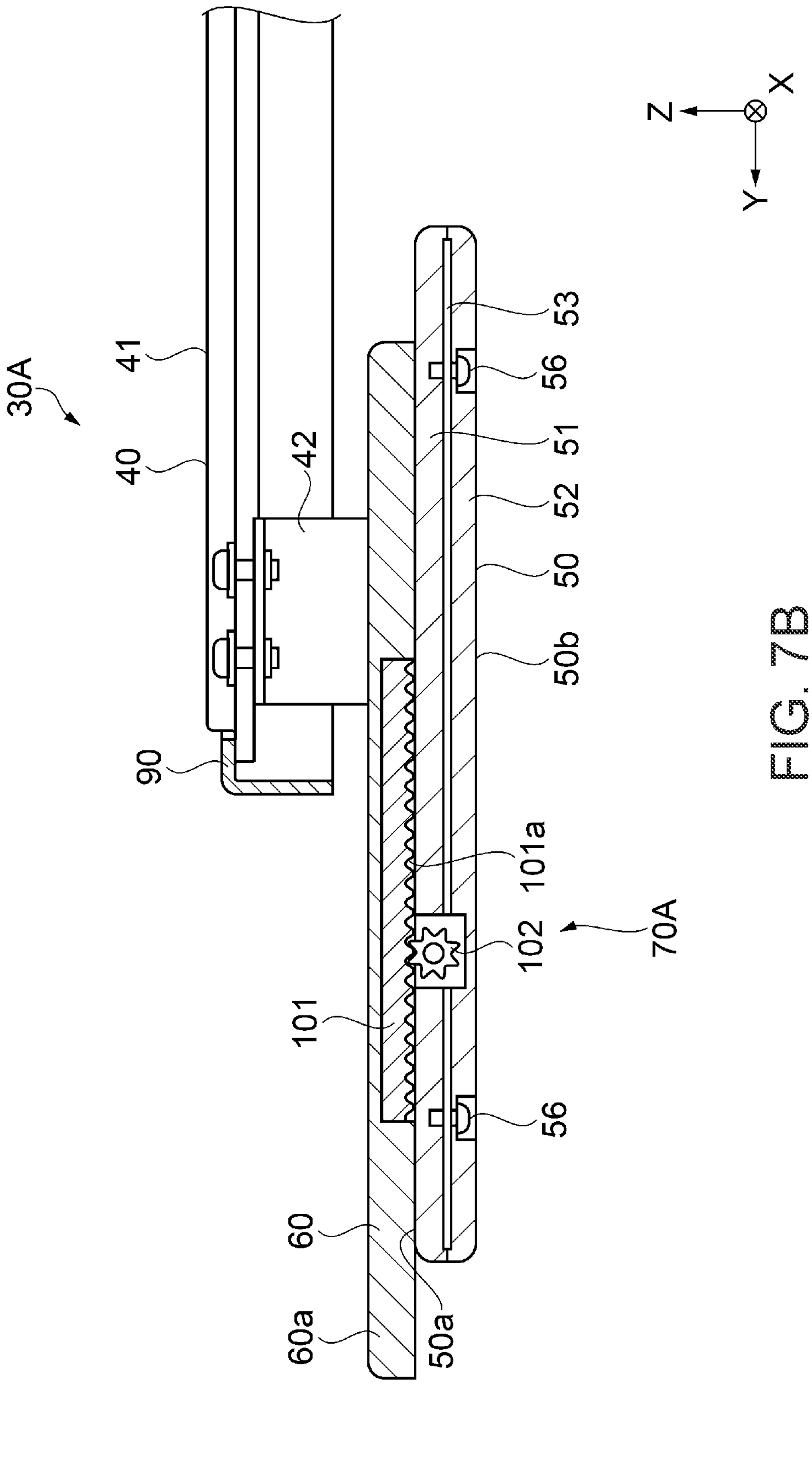
FIG. 7B is a sectional view showing a configuration of another guide section.

In this case, a finger is put on the main body section 60*a* of the moving section 60 to press the moving section 60 in the +Y direction. Then, as shown in FIG. 7B, the moving section 60 moves in the +Y direction along the slide surface 50*a* of the base section 50. At this time, the moving section 60 moves in the +Y direction, while the pinion 102 rotates counterclockwise rotation direction.

Here, in a case where the moving section 60 is moved in the +Y direction with respect to the base section 50, the pinion 102 rotates in the counterclockwise rotation direction, the torque generated in the pinion 102 is small, and the load applied to the moving section 60 is relatively small.

Therefore, the movement of the moving section 60 in the +Y direction can be easily performed.

In the present embodiment, the moving section 60 can be moved in the +Y direction to a position at which the pinion 102 engages with the recess section 101*a* at the −Y direction end portion of the rack 101. Since the guide section 70A of the present embodiment is configured by the rack 101 and the pinion 102, the position of the moving section 60 relative to the base section 50 can be adjusted substantially steplessly. Thus, the setting position of the T-shirt Ma can be arbitrarily set, and printing can be performed at a desired position. The movement range of the moving section 60 in the direction along the Y-axis is restricted by the distance dimension of the elongated hole 55 in the direction along the Y-axis. Therefore, the elongated hole 55 is appropriately formed corresponding to the distance dimension of the rack 101 in the direction along the Y-axis.

Next, for example, as shown in FIG. 7B, a case where the moving section 60 is moved in the −Y direction with respect to the base section 50 from the state in which the moving section 60 is moved in the +Y direction with respect to the base section 50 will be described.

In this case, a finger is put on the main body section 60*a* of the moving section 60 to press the moving section 60 in the −Y direction. Then, the moving section 60 moves in the −Y direction along the slide surface 50*a* of the base section 50. At this time, the moving section 60 moves in the −Y direction, while the pinion 102 rotates clockwise rotation direction.

Here, in a case where the moving section 60 is moved in the −Y direction with respect to the base section 50, since the pinion 102 rotates in the clockwise rotation direction, the torque generated in the pinion 102 is large, and the load applied to the moving section 60 becomes relatively large. Therefore, when the moving section 60 moves in the −Y direction, a constant restricting force is generated.

Therefore, when the T-shirt Ma is setting with the platen 30A in a state where the moving section 60 has moved to the +Y direction side with respect to the base section 50, it is possible to make it difficult for the moving section 60 to move in the −Y direction. Accordingly, the T-shirt Ma can be smoothly set on the platen 30 in a state where the predetermined position of the moving section 60 is held. In addition, since the moving section 60 is held at a predetermined position, for example, it is easy to hold the printing position of each T-shirt Ma of each lot, and it is possible to reduce the variation of the printing position in the lot.

Since the engagement mechanism of the guide section 70A is configured not to protrude from the outer shapes of the base section 50 and the moving section 60 and no protrusion or the like protruding outward from the back surface 50*b* of the base section 50 is formed, the medium M (T-shirt Ma) can be smoothly set without being caught when the medium M is set on the platen 30. Furthermore, damage to the medium M and the like can be suppressed.

Another configuration example is described below.

Although the first embodiment and the second embodiment are configured such that the moving section 60 is disposed between the support section 40 and the base section 50 in the direction along the Z-axis, there is no limitation to this. In the direction along the Z-axis, a configuration may be the base section 50 is disposed below the support section 40, and the moving section 60 may be disposed below the base section 50.

The guide sections 70 and 70A of the first embodiment and the second embodiment are configured such that the recesses 72 and 101*a* are provided in the moving section 60 and the engagement section (the leaf spring 75, the pinion 102) is provided in the base section 50, but is not limited thereto. For example, a configuration may be adopted in which the recess sections 72 and 101*a* are provided in the base section 50 and the engagement section is provided in the moving section 60.

Although the first embodiment and the second embodiment are configured such that the elongated hole 55 is provided in the base section 50 and the protrusion 61 is provided in the moving section 60, there is no limitation to this. For example, a configuration may be adopted in which the elongated hole 55 is provided in the moving section 60 and the protrusion 61 is provided in the base section 50.

In the first embodiment and the second embodiment, the configuration example of the printing device 1 including the platen 30 has been described, but there is no limitation to this, and the platen 30 that supports the medium M can be applied to various apparatuses. It is also possible to use the platen 30 alone.

What is claimed is:

1. A platen comprising:
- a support section configured to support a printing area of a medium;
- a base section fixed to the support section;
- a moving section configured to move relative to the base section, wherein the moving section is attached to the base section; and
- a guide section configured to guide the movement of the moving section, wherein
- the guide section is incorporated so as to not protrude from the outer surface of the base section and the moving section.

2. The platen according to claim 1, wherein the moving section is positioned between the support section and the base section.

3. The platen according to claim 2, wherein
- the base section has a slide surface parallel to a support surface on which the support section supports the medium and
- the moving section is configured to move along the slide surface.

4. The platen according to claim 2, wherein
- a position indicator indicating a position of the moving section with respect to the base section is provided on one of the base section and the moving section and
- a visual check section configured to enable a visual check of the position indicator is provided on the other of the base section and the moving section.

5. The platen according to claim 1, wherein
- the guide section includes
  - a recess section forming section that is provided in the moving section and that has a plurality of recess sections formed along a moving direction of the moving section and
  - an engagement section that is provided on the base section and that engages with the recess section.

6. The platen according to claim 5, wherein the engagement section is composed of a leaf spring.

7. The platen according to claim 5, wherein
- the recess section forming section is composed of a rack,
- the engagement section is composed of a pinion that engages with the rack, and
- the pinion has a one-way torque damper.

8. The platen according to claim 1, wherein
- the guide section includes a protrusion provided on the moving section and the protrusion is fitted into an elongated hole formed in the base section along a moving direction of the moving section, and is movable along the elongated hole in accordance with movement of the moving section.

9. A printing device comprising:

a printing section configured to print on a medium;

a support section configured to support a printing area of the medium;

a placement section on which the support section is placed;

a base section fixed to the support section;

a moving section configured to move relative to the base section, wherein the moving section is attached to the base section; and a guide section configured to guide the movement of the moving section, wherein the guide section is incorporated so as to not protrude from the outer surface of the base section and the moving section.

10. A platen comprising:

a support section configured to support a printing area of a medium;

a base section fixed to the support section;

a moving section configured to move relative to the base section; and a guide section configured to guide the movement of the moving section, wherein the guide section is incorporated inside the base section and the moving section so as to not protrude from the outer surface of the base section and the moving section.

* * * * *